United States Patent
Matsuyama et al.

(10) Patent No.: US 6,886,028 B1
(45) Date of Patent: Apr. 26, 2005

(54) INFORMATION PROCESSING APPARATUS, INFORMATION PROCESSING METHOD, AND COMPUTER-READABLE PROGRAM STORAGE MEDIUM

(75) Inventors: Yoichi Matsuyama, Kawasaki (JP); Shigeyuki Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,052

(22) Filed: Jul. 28, 1999

(30) Foreign Application Priority Data

Jul. 31, 1998  (JP) .......................................... 10-217423
Jul. 5, 1999  (JP) .......................................... 11-190411

(51) Int. Cl.[7] .............................................. G06F 15/16
(52) U.S. Cl. ........................... 709/203; 710/8; 358/1.15
(58) Field of Search ................................ 709/203, 220, 709/327; 710/8, 19; 358/1.15, 1.14; 705/27

(56) References Cited

U.S. PATENT DOCUMENTS

| | | | | |
|---|---|---|---|---|
| 5,506,661 A | * | 4/1996 | Hanzawa ........................ 399/1 |
| 5,819,015 A | * | 10/1998 | Martin et al. ............... 358/1.13 |
| 6,112,256 A | * | 8/2000 | Goffinet et al. ............. 709/221 |
| 6,246,486 B1 | * | 6/2001 | Takahashi ................... 358/1.13 |
| 6,307,640 B1 | * | 10/2001 | Motegi ....................... 358/1.14 |
| 6,324,521 B1 | * | 11/2001 | Shiota et al. .................. 705/27 |
| 6,330,068 B1 | * | 12/2001 | Matsuyama ................ 358/1.14 |
| 6,351,317 B1 | * | 2/2002 | Sasaki et al. .............. 358/1.12 |
| 6,362,894 B1 | * | 3/2002 | Shima ........................ 358/1.12 |
| 6,384,930 B1 | * | 5/2002 | Ando ........................ 358/1.17 |

* cited by examiner

Primary Examiner—Nabil El-Hady
Assistant Examiner—Jinsong Hu
(74) Attorney, Agent, or Firm—Fitzpatrick, Cella, Harper & Scinto

(57) ABSTRACT

The objective of the present invention is a reduction of the communications exchanged by a WWW server and a client computer in order to reduce communication costs and to improve the responses by a user interface. For this, a printing control apparatus comprises means for obtaining print setup information from a WWW server and storing it, and for transmitting print request information to the WWW server via a network. But before that means is used to communicate with the WWW server, the print request information is generated based on the obtained print setup information.

33 Claims, 15 Drawing Sheets

```
SHEET SIZE=POSTCARD, A4, A3
POSTCARD=¥50
A4=¥100
A3=¥200
```

| PRINT SERVER NAME | NETWORK ADDRESS |
|---|---|
| PRINT SERVER 1 | print11.xxx.co.jp |
| PRINT SERVER 2 | prsvr0.zzz.co.jp |
| ⋮ | ⋮ |

FIG. 17A

```
<HTML>
<HEAD><TITLE>SETTING OF PRINT DETAIL</TITLE></HEAD>
<BODY>
<H1>SETTING OF PRINT DETAIL</H1><HR>
<IMG SRC=@PREVIEW@>
<EMBED TYPE=" APPLICATION/X-PRINT-INFO"WIDTH=150 HEIGHT=100>
</BODY>
```

FIG. 17B

```
<HTML>
<HEAD><TITLE>SETTING OF PRINT DETAIL</TITLE></HEAD>
<BODY>
<H1>SETTING OF PRINT DETAIL</H1><HR>
<IMG SRC="file://C:/previews/aaa0234.jpg" >
<EMBED TYPE="APPLICATION/X-PRINT-INFO"WIDTH=150 HEIGHT=100>
</BODY>
```

INFORMATION PROCESSING APPARATUS, INFORMATION PROCESSING METHOD, AND COMPUTER-READABLE PROGRAM STORAGE MEDIUM

BACKGROUND OF THE INVENTION

1. Field of the Invention

The present invention relates to an information processing apparatus, which can communicate with an external apparatus across a network, and an information processing method therefor, and to a storage medium and a control program, for implementing information processing, that is stored on the storage medium.

2. Related Background Art

With a conventional network system, to print a document a client computer must submit a printing request to a network print controller, which thereafter transmits a printing order to an arbitrary print server (a printer). To enable the client computer to specify which document is to be printed, the size of the paper to be used and the number of copies that are desired, a user interface provided by a WWW (World Wide Web) server in the print controller is used for the submission of the printing request; and the requested printing order is prepared through the exchange of information by the WWW server and the client computer.

In the above conventional system, upon receiving from the client an entry made by a user, the WWW server must prepare a WWW page containing the setup procedures that accompany a printing order issued to a corresponding print server (a printer), and must transmit the page to the client. Furthermore, various information, such as the input of a user ID and a password, the selection of a print server to act as an output shop and the selection of a printing medium to receive the Internet printing service, must be exchanged with a client when preparing the printing order. Therefore, during the preparation of the printing order data transmission across the network is performed a number of times, and as a result, the responses of the user interface tend to become deteriorated, especially when a low-speed line is employed.

Further, since the printing order is prepared by using the user interface provided at the print controller, the client computer must be connected, using a dial-up connection, not only during the transmission of the printing request to the print controller but also during the preparation of the printing order. Thus, communication costs are increased.

SUMMARY OF THE INVENTION

To resolve the above described shortcomings, it is one objective of the present invention to provide an information processing apparatus that reduces the time required for communication with an external apparatus to the greatest extent possible, that continuously retains correct information and an information processing method, and that includes a program storage medium.

To achieve the above objective, according to the present invention, an information processing apparatus, for communicating with an external apparatus via the Internet, comprises:

acquisition means for acquiring, via the Internet, print setup information from the external apparatus;

generation means for generating print request information based on the print setup information acquired by the acquisition means; and print request means for establishing communication, via the Internet, with the external apparatus for the transmission of the print request information, wherein the print request information is generated by the generation means before the print request means establishes communication with the external apparatus.

The print setup information, which is information describing an output style, is available at a printer for the performance of printing based on the information included in the print request.

The information processing apparatus further comprises storage means for storing the print setup information, and before communicating with the external apparatus using the print request means, examines the print setup information stored in the storage means to determine if the print setup information is newer than the print setup information that is available at the external apparatus.

The information processing apparatus further comprises derivation means that, before communication is established with the external apparatus by the print request means, employs the print setup information to derive the expenses that will be incurred to obtain the desired printing results.

Further, before communication is established with the external apparatus using the print request means, the derivation means employs print setup information available at the external apparatus to re-derive the expenses that will be incurred to obtain the printing results.

The print setup information is HTML data generated for the external apparatus, and the external apparatus manages the print setup information for each output shop.

The generation means is a peruser plug-in function, and employs the application communication function of an OS to generate the print request information for a document that is currently being edited by a document editor.

For communication purposes, a dial-up connection is used to connect the external apparatus to the Internet.

According to the present invention, an information processing apparatus comprises:

network browsing means for communicating with a server across a network and for displaying data received from the server;

acquisition means for acquiring information about the server and for storing the information at a client computer; and display data generation means having a CGI function for employing the information held by the client computer and separately acquired HTML template data to generate HTML data that the network browsing means is capable of displaying.

To implement the present invention the same procedures can be used by a storage medium, for storing a method and a program, and by a control program.

BRIEF DESCRIPTION OF THE DRAWINGS

FIGS. 17A and 17B are diagrams for explaining an HTML template; and

DETAILED DESCRIPTION OF THE PREFERRED EMBODIMENTS

[First Embodiment]
System Configuration

Figure 1:
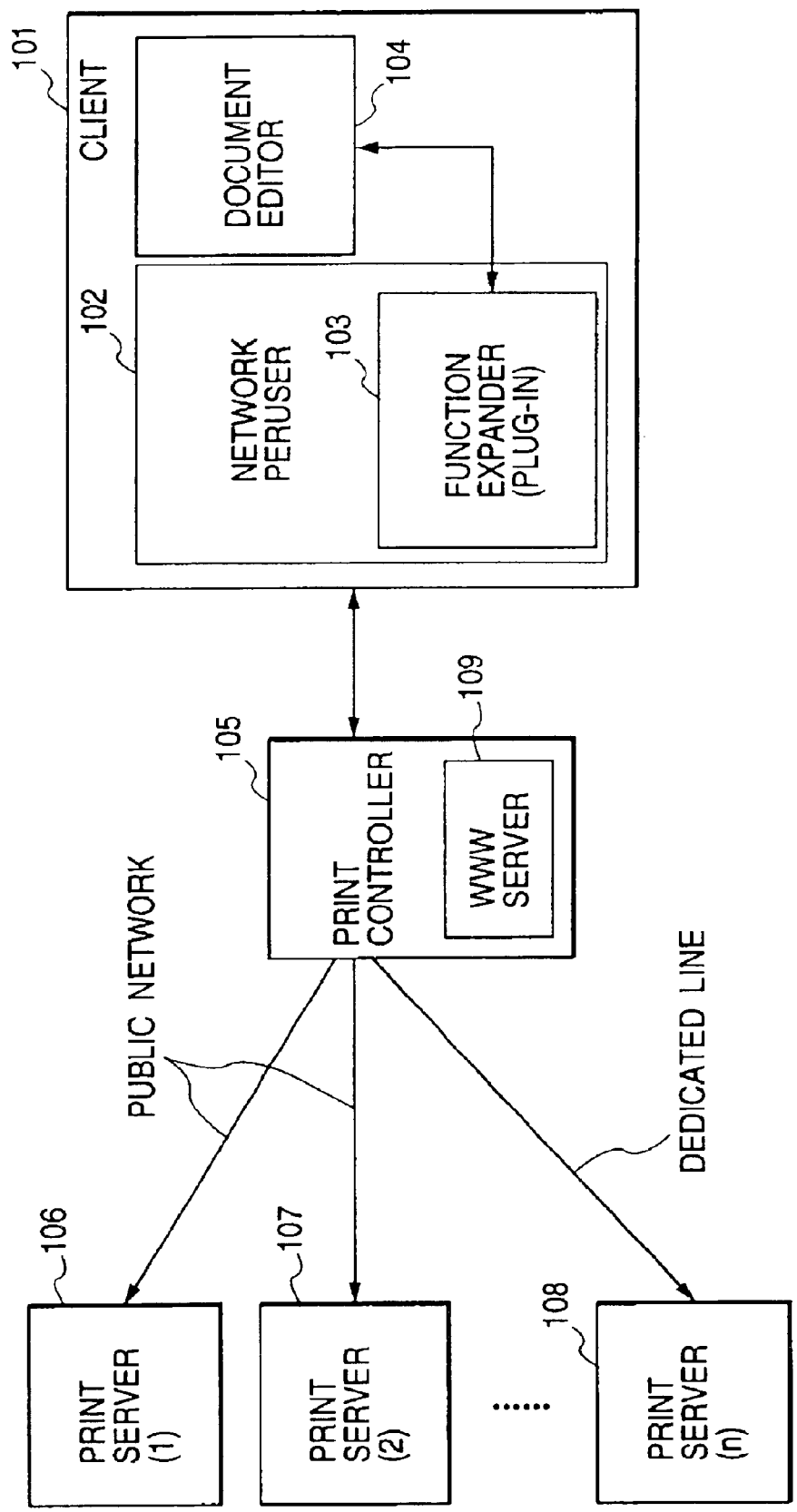
FIG. 1 is a diagram illustrating the system configuration of a printing control apparatus according to the present invention.

FIG. 1 is a diagram illustrating the system configuration of a printing control system according to the present invention.

In FIG. 1, a client computer 101 is an information processing apparatus according to the first embodiment of the present invention. The client computer 101 utilizes a network print service provided via the Internet and a network serviced by a print controller 105.

A network peruser 102 functions as a browser operated by the client computer 101. The network peruser 102 interprets a file composed using HTML (an HTML (HyperText Markup Language) file) that is obtained via the Internet and a network from a WWW (World Wide Web) server 109 in the print controller 105, or an HTML file stored on a hard disk drive (HDD) 1009 in the client computer 101, and displays the results on the client computer 101 (a CRT 1006 that will be described later).

The HTML file obtained from the WWW server 109 is a file stored in the print controller 102 wherein the WWW server 109 is disposed, or a file dynamically generated in accordance with a CGI (Common Gateway Interface) program employed by the print controller 102 via the WWW server 109. Functions can be added or expanded by setting up function expanders that will be described later.

Function expanders (plug-ins) 103 are used to expand the range of the functions available at the network peruser 102. When in an HTML file interpreted by the network peruser 102 the performance of a described function is specified, a function expander 103 corresponding to the description is executed by the network peruser 102. To facilitate this, a plurality of function expanders 103 are set up that correspond to functions that are to be executed, and in this embodiment, the individual function expanders 103 are identified by providing each of them with a purposefully descriptive name, such as download function expander. A function expander 103 is activated by generating for its execution an HTML file that the network peruser 102 is permitted to read.

A document editor 104, which is operated by the client computer 101, has as one function the creation or the editing of a document, by assembling character data, graphic data and image data, and has as another function the storage of a document file on the HDD 1009 of the client computer 101.

A print controller 105 receives a printing order from a client computer 101, selects a print server to perform the requested processing, and transmits the printing order to the selected print server. The print controller 105 communicates with the client computer 101 via the Internet, and assigns the printing order to an individual print server that functions as an output shop. For this system, the print controller 105 serves as the core, and hereinafter is sometimes called a center server.

At least one print server is provided at each of output shops 106, 107 and 108 to perform the printing specified in a printing order received from the print controller 105, the center server. The individual print servers provide unique services, such as the provision of special sheet sizes, recording media (regular paper, glossy paper, T-shirts, drinking mugs, etc.), transfer methods (over-the-counter delivery, mail delivery, etc.), and payment methods (over-the-counter payments, electronic settlements, etc.). In order to determine what services are available, during the preparation of a printing order, the client computer 101 must know which services are provided by which print servers.

The client computer 101 and the print controller 105, and the print controller 105 and the print servers 103, 104 and 105 are interconnected via the Internet. The print servers 106 and 107, which are output shops, are connected via dial-up connections to the print controller 105, which is the center server, and the print server 108 is connected to the center server 105 by a dedicated line.

Provided for the WWW server 109 are a plurality of CGI programs that are executed by the print controller 105. Upon receiving an acquisition request for an HTML file from the network peruser 102 in the client computer 101, the WWW server 109 transmits the desired HTML file to the network peruser 102. When a request for the execution of a CGI program is received from the network peruser 102, the WWW server 109 executes the pertinent CGI program and transmits to the network peruser 102 an HTML file that is obtained as a result of the execution of the CGI program.

In this system, the network peruser 102, which in the client computer 101 is a browser, accesses the WWW server 109 in the print controller 105 and acquires thumbnail images for image data (print image data) managed by the print controller 105, and provides them on a display for a user. When the user selects a thumbnail image, the download function expander (a plug-in) is activated and downloads to the document editor 104 an editing image corresponding to the thumbnail image. After the document editor has edited the downloaded image, it generates editing information concerning locations whereat individual images having image IDs are to be pasted, and concerning an image editing method and a sheet size that was employed for the editing. Based on the editing information, the document editor 104 activates the network peruser 102 to prepare a printing order. In order to prepare the printing order, first, a user interface for a print request is provided by a method that will be described later. After the printing order has been prepared, the network peruser 102 is connected across the Internet to the print controller 105, which is the center server, and transmits the printing order to the WWW server 109.

The print controller 105 detects an output shop at a print server designated in the printing order that is received by the WWW server 109, and registers the output shop in the printing order list. When the print server 108 connected along the dedicated line is designated as the output shop, the print controller 105 obtains an image for printing that is designated by the image ID contained in the printing order, and transmits the printing order and the printing image to the print server 108. When a print server for which a dial-up connection is employed is designated as the output shop, the print controller 105 waits for a connection to be effected with the print server 106 or 107, while at the same time the print server 106 or 107 is registered in the printing order list managed by the print controller 105. When a dial-up connection is established and the print server 106 or 107 is connected to the print controller 105, the print controller 105 searches the internally managed printing order list, and determines whether the services requested in the printing order are available at the pertinent print server. If the services requested in the printing order are available, the print controller 105 transmits to the print server 106 or 107 the printing order and an image for the printing that is obtained in advance.

Based on the printing order and the printing image that are received from the center server via the Internet, the print server that is functioning as the output shop edits the printing image to obtain a desired printing form, and prints it in the form designated in the printing order. After the printing is completed, by establishing a connection along the dedicated line or through a dial-up connection, the print server notifies the print controller 105 that the printing has been completed. Upon receiving the notification, the print controller 105 changes to print end the status of the pertinent printing order on the managed printing order list, and uses E-mail to notify the client computer that issued the printing request that the printing has been completed.

Block Diagram of a Client Computer

Figure 2:
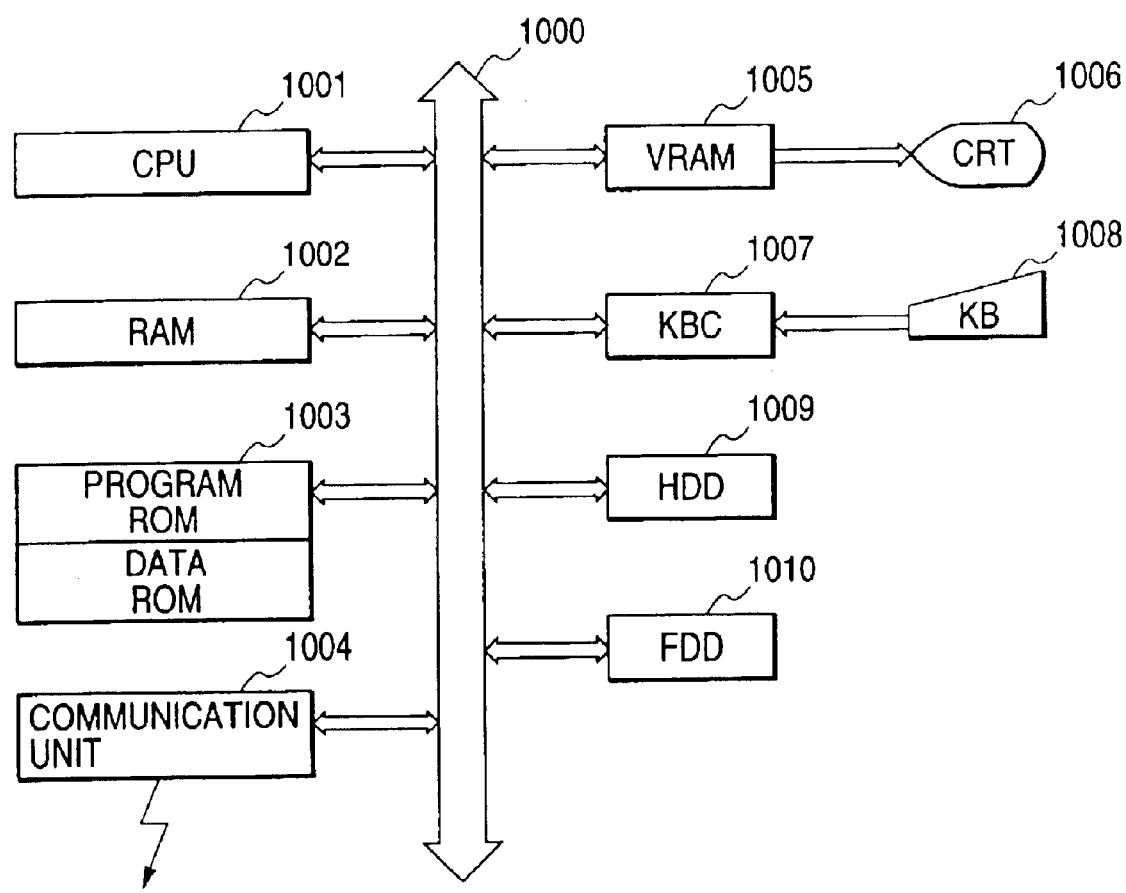
FIG. 2 is a diagram illustrating the system configuration of a client computer.

FIG. 2 is a block diagram illustrating the system configuration of the client computer 101.

In FIG. 2, a CPU 1001 controls the entire apparatus.

A RAM 1002 is the main memory for the CPU 1001 and serves as a work area or a temporary storage area for an execution program.

A ROM 1003, which is used to store operating procedures for the CPU 1001, includes a program ROM, in which is stored a system program for controlling devices in the print server and programs represented in the flowcharts in FIGS. 5, 8, 15 and 16, and a data ROM, in which is stored information for the activation of the system.

A communication unit 1004 exchanges data with the print controller 105, with which communication may be conducted via a connection to the Internet provided by a dial-up connection to a public line, or via a LAN connection to a proxy server on a dedicated line.

A video RAM (VRAM) 1005 develops an image displayed on the screen of a CRT 1006 representing the operating state of the system, and controls the display.

A keyboard controller 1007 controls a signal entered at an external input device 1008, such as a keyboard.

The external input device 1008 accepts input entered by manipulation of the device, and is generally a keyboard or a pointing device (a mouse).

The hard disk drive (HDD) 1009 is used to store an HTML file that is created by the network peruser 102 and the function expander 103, and a document file that is created by the document editor 104. In addition, for an output shop, shop information, which will be described later, that is obtained from the center server is also stored on the HDD 1009.

A removable disk drive (an FDD) 1010 for floppy disks is used to read from a storage medium an application program that will be described later.

An I/O bus 1000 (an address bus, a data bus and a control bus) connects the individual units together.

Block Diagram for a Print Controller

Figure 3:
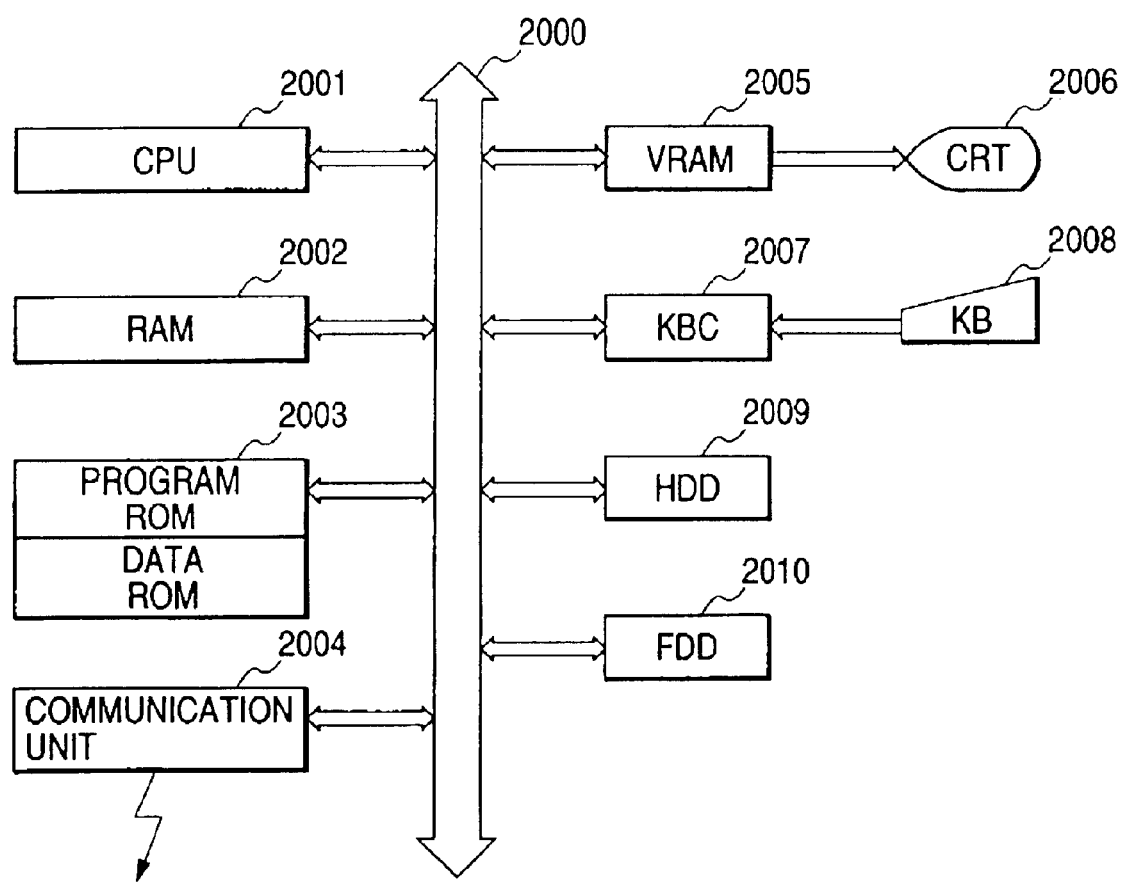
FIG. 3 is a diagram illustrating the system configuration of a print controller.

FIG. 3 is a block diagram illustrating the system configuration of the print controller 105.

In FIG. 3, a CPU 2001 controls the entire apparatus.

A RAM 2002 is the main memory for the CPU 2001 and serves as a work area or a temporary storage area for an execution program.

A ROM 2003, which is used to store operating procedures for the CPU 2001, includes a program ROM, for storing a system program for controlling devices in the print controller and a program represented in the flowchart in FIG. 1, and a data ROM, for storing information required for the activation of the system.

A communication unit 2004 exchanges data with the print server that will be described later, and controls and evaluates data for transmission over a network (the Internet, etc.) that connects the client computer 101 to the print controller 105. Thus, the communication unit 2004 receives editing information from the client computer 101 and transmits it to the print server.

A video RAM (VRAM) 2005 develops an image representing the operating state of the system that is displayed on the screen of a CRT 2006, and controls the display.

A keyboard controller 2007 controls a signal entered at an external input device 2008, such as a keyboard. The external input device 2008 accepts input entered by the manipulation of the device, and is generally a keyboard or a pointing device (a mouse).

A hard disk drive (HDD) 2009 is used to store a WWW server program and print server information.

A removable disk drive (an FDD) 2010 for floppy disks is used to read from a storage medium an application program that will be described later.

An I/O bus 2000 (an address bus, a data bus and a control bus) connects the individual units together.

In the print controller 105, the WWW server 109 is operated so that upon receiving a request from the network peruser 102 in the client computer 101, the WWW server transmits, to the network peruser 102, a standard HTML file or an HTML file that has been dynamically generated by the CGI program stored on the HDD 2009.

The WWW server 109 is activated when a WWW server program stored on the HDD 2009 is executed. When a request from the network peruser 102 of the client computer 101 for the execution of a CGI program is received via the network, the WWW server 109 in the operating state executes the pertinent CGI program, and transmits an HTML file obtained as a result via the network to the network peruser 102 of the client computer 101.

Block Diagram for a Print Server

Figure 4:
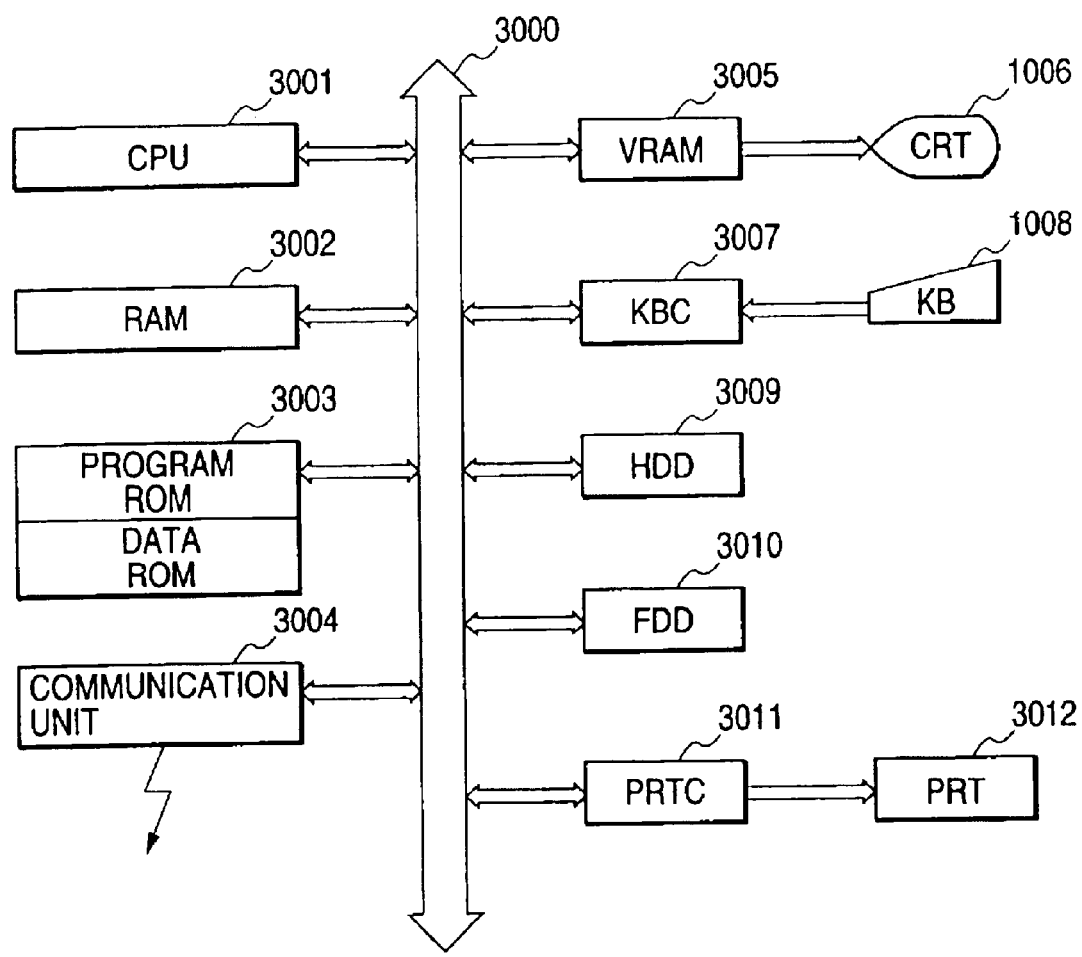
FIG. 4 is a diagram illustrating the system configuration of a print server.

FIG. 4 is a block diagram showing the system configuration of the print server.

In FIG. 4, a CPU 3001 controls the entire apparatus.

A RAM 3002 is the main memory for the CPU 3001 and serves as a work area or a temporary storage area for an execution program.

A ROM 3003 is used to store operating procedures for the CPU 3001, which includes a program ROM, for storing a system program for controlling devices in the print server and an image editing program for editing a printing image in accordance with the printing order, and a data ROM, for storing information required for the activation of the system.

A communication unit 3004 exchanges data with the print controller 1056, and with another print server and an image server, controls and evaluates data for the transmission of image data.

A video RAM (VRAM) 3005 develops an image representing the operating state of the system that is displayed on the screen of a CRT 3006 and controls the display.

A keyboard controller 3007 controls a signal entered at an external input device 3008, such as a keyboard, that accepts input entered by the manipulation of the device, and is generally a keyboard or a pointing device (a mouse).

A hard disk drive (HDD) 3009 is used to store a program for processing a print request received from the print controller 105.

A removable disk drive (an FDD) 3010 for a floppy disk is used to read from a storage medium an application program that will be described later.

A printer controller 3011 controls a printer 3012 and also controls an image to be output.

The printer 3012 is used by the print server for printing. A plurality of printers can be connected to one print server by an I/O bus 3000 (an address bus, a data bus and a control bus) that also connects the individual units together.

Explanation of the Operation

The overall operation of this system will now be described while referring to the accompanying drawings.

Registration of a Print Server

Before utilizing the printing system, a user employs the network peruser 102 in the client computer 101 to temporarily access the WWW server 109 in the print controller 105, and registers a print server that is to be used.

Figure 5:
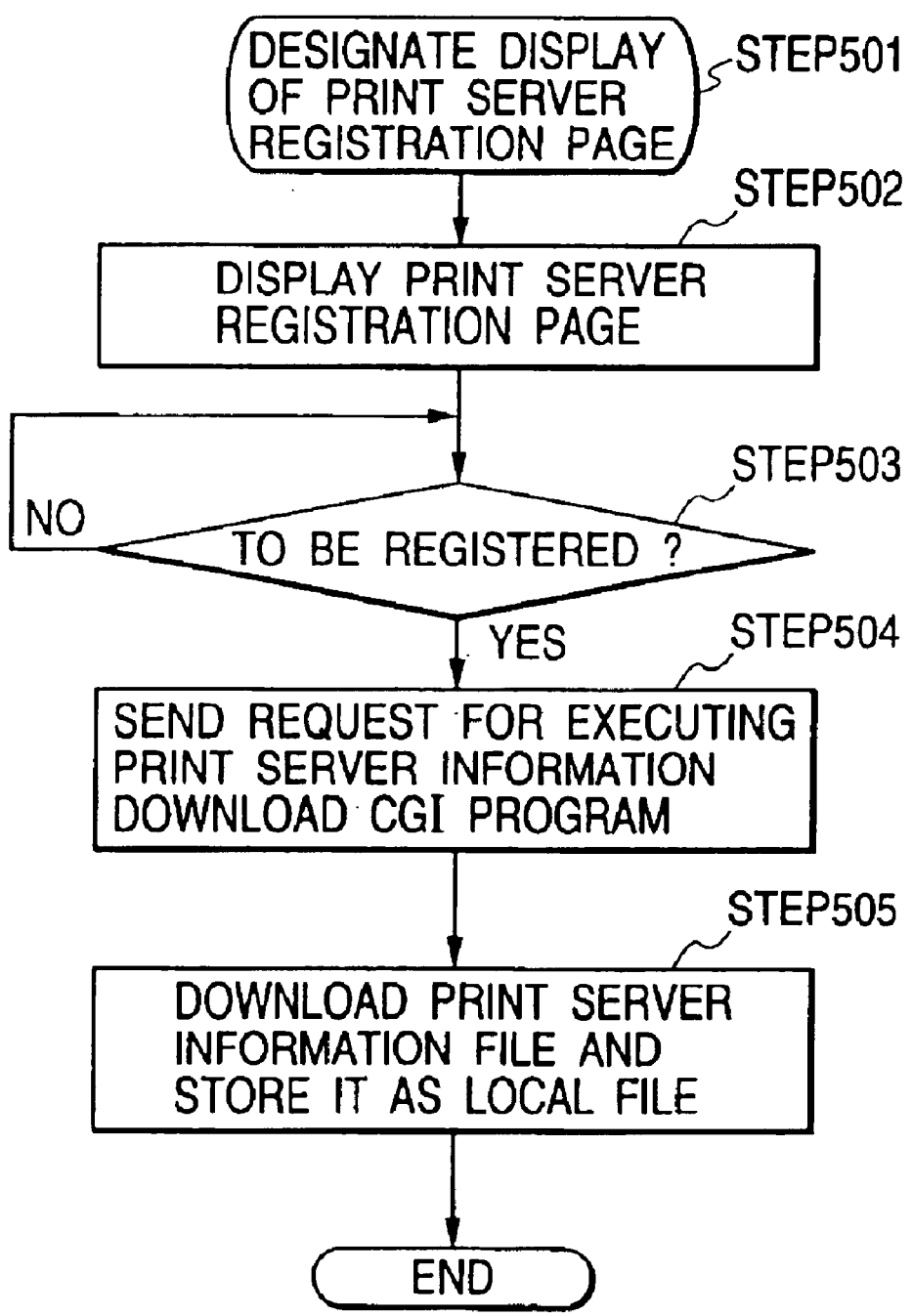
FIG. 5 is a flowchart showing the print server registration processing performed by a client computer.

FIG. 5 is a flowchart for explaining the print server registration processing performed by the client computer 101. The control exercised by the client computer 101 will be explained while referring to this flowchart.

The processing in this flowchart is initiated when an operator selects the "output shop registration" menu while the document editor 104 in the client computer 101 is employing a specific document editing application. The following document editing application is begun by activating a browser (network peruser) via the OS.

At STEP501, when a user selects the "output shop registration" menu of a document editing application by using a pointing device, such as a mouse, the URL (Uniform Resource Location: see RFC1738) of a print server registration page in the WWW server 109 is designated by the URL designation function of the network peruser 102, and the client computer 101 transmits to the WWW server 109 of the print controller 105, via the communication unit 1004, an HTML file acquisition request from the network peruser 103.

When an HTML file corresponding to the URL of an HTML file included in the HTML file acquisition request is transmitted by the WWW server 109, program control moves to STEP502.

Figures 6, 7:
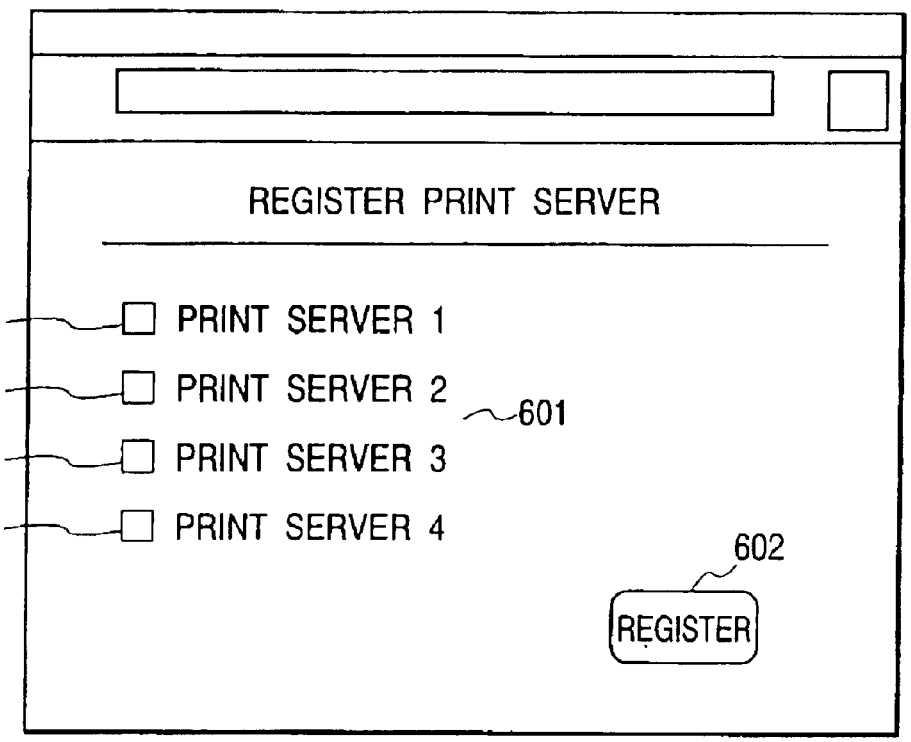
FIG. 6 is a diagram for explaining a print server registration page.
FIG. 7 is a diagram showing an example print server information file.

At STEP502, the network peruser 102 interprets an HTML file obtained from the WWW server 109 in the print controller 105, and displays the print server registration page shown in FIG. 6 on the CRT 1006.

When a user enters a check mark in a check box 603 for an arbitrary print server name in a print server name display/ selection area 601 in FIG. 6, an arbitrary number of print server names are selected.

At STEP503, the network peruser 102 determines whether a registration button 602 in FIG. 6 has been depressed. When the registration button 602 has been depressed by a user via the external input device 1008, program control advances to STEP504.

At STEP 504, the network peruser 102 transmits a print server information download CGI program execution request to the WWW server 109 in the print controller 105. The requested print server information is print server information for the print server that was selected using the check box 603 in FIG. 6.

The WWW server 109 of the print controller 105 activates the CGI program designated in the CGI program execution request, and outputs an HTML file as a result. When the network peruser 102, which is a request source, receives the HTML file, program control goes to STEP505.

The print server information download CGI program generates an HTML file to execute the print server information download function expander (a plug-in) 103 for downloading a print server information file corresponding to a print server name that has been received as an argument. At this time, a list of the URLs of print server information files, for print servers in the print controller 105, to be downloaded is received as data for the print server information download function expander (a plug-in) 103.

At STEP505, the HTML file from the WWW server 109, which is transmitted to the network peruser 102 as a result of the activation of the print server information download CGI program in the print controller 105, is read by the network peruser 102, and operation of the print server information download function editor 103 is initiated. An example of the contents of a print sever information file is shown in FIG. 7. The print server information download function expander 103 then downloads, from the center server, an HTML file containing, in the received URL data, print server information consisting of shop information for an output shop, and using the print server name as the file name, stores the HTML file on the HDD 1009 of the client computer 101.

In FIG. 7, the sheet sizes and the prices are shown in a shop information file. In addition to this information, other information may be provided, such as "output form= postcard, regular paper, glossy paper, T shirt, mug cap", "payment method=electronic settlement, over-the-counter payment", "transfer method=delivery, over-the-counter delivery."

Figure 18:
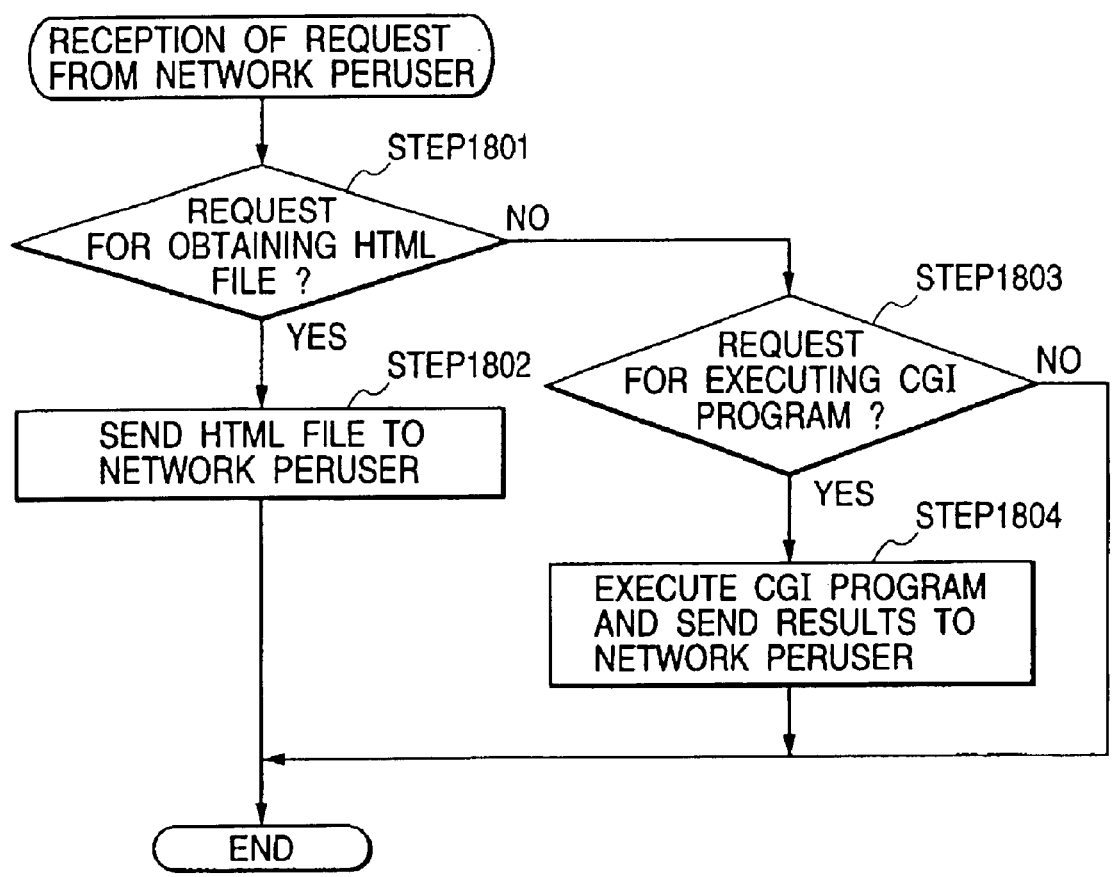
FIG. 18 is a flowchart showing the processing performed by a print controller.

FIG. 18 is a flowchart showing the processing performed by the WWW server 109 of the print controller 105. The following process is performed by the center server when the "output shop registration" process is performed by the client computer 101.

When a request from the network peruser 102 is received, at STEP1801 the WWW server 109 determines whether or not the request is an HTML file acquisition request. When the request is an HTML file acquisition request, program control advances to STEP1802, and when the request is not an HTML file acquisition request, program control advances to STEP1803. If the WWW server 109 is accessed by a client computer 101 that uses this system the first time, the request is a CGI program execution request because the client computer does not know a shop information URL. Thus, program control goes to STEP1803.

At STEP1802, the WWW server 109 transmits, to the requesting network peruser 102, an HTML file corresponding to the URL of an HTML file that is included in the HTML file acquisition request.

At STEP1803, the WWW server 109 determines whether the request from the network peruser 102 is a CGI program execution request. If the request is a CGI program execution request, program control advances to STEP1804, while if the request is not a CGI program execution request, the processing is terminated.

At STEP1804, the WWW server 109 in the print controller 105 activates a CGI program designated in the CGI program execution request, and as a result of the execution, transmits the HTML file to the requesting network peruser 102. And the print server information download CGI program generates an HTML file to execute the print server information download function expander 103 for downloading a print server information file corresponding to the print server name received as an argument. At this time, a list of URLs of print server information files, for print servers in the print controller 105 to that is be downloaded, is received as data for the print server information download function expander 103. An example of the contents of the print server information (shop information) file is shown in FIG. 7.

Creation of a Document to be Printed

A user employs the document creation/editing function of the document editor 104 in the client computer 101 to create a document to be printed by the print server 106. In this embodiment, the document editor 104 is, for example, desktop publishing application software. The document editing application activates the browser 102 before the image editing process is begun, downloads, from the center server 105, a low-resolution image for editing that corresponds to a high-resolution image for printing, and edits the downloaded image. To print an edited file after the image editing has been performed, the document editing application activates the browser 102, and via the Internet, accesses the center server 105 to transmit the printing order. The printing order is a file including editing information for a script form and an image ID, and consists of a very small amount of data. Therefore, since the load imposed during transmission via the network (Internet) is very small and the Internet access time for the client computer is reduced, a very satisfactory operating condition can be provided for a user.

Execution of Network Printing

Figure 8:
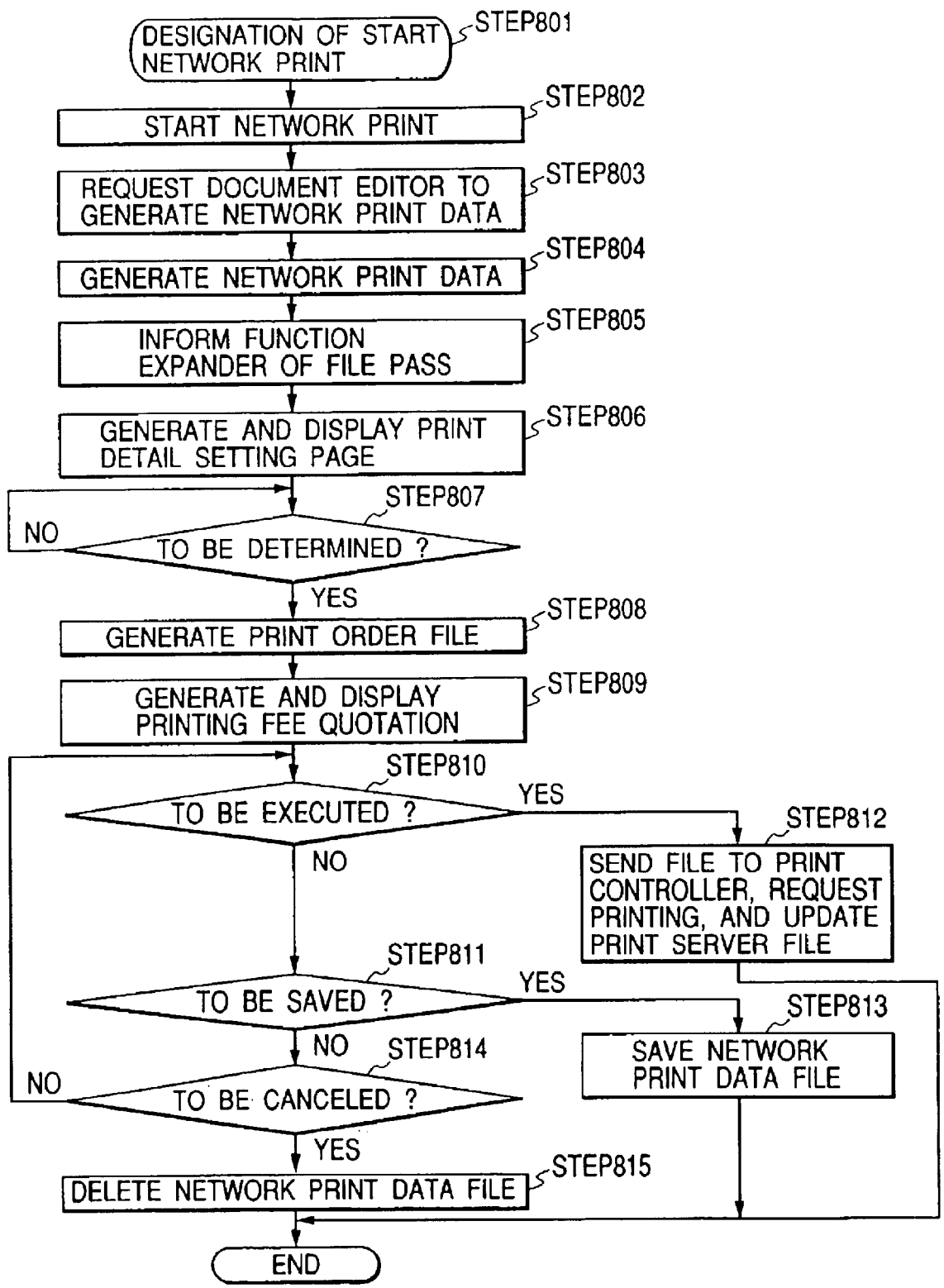
FIG. 8 is a flowchart showing the network printing processing performed by the client computer according to a first embodiment of the present invention.

FIG. 8 is a flowchart showing the network printing processing performed using the network peruser 102 of the client computer 101.

At STEP801, when a user selects a network print command in the document editor 104, or a print button on the user interface, the document editor 104 issues a request for the printing of a document that is being edited.

At STEP802, the document editor 104 activates the network peruser 102 by using as an argument the path of a network printing start HTML file stored on the HDD 1009. The network printing start HTML file is stored on the HDD 1009 by a derivation program when the document editor 104 is operated by the client computer 101, and its path is recorded in a setup file that is used to store various setups for the document editor 104. The document editor 104 obtains the path of the network printing start HTML file from the setup file.

The network peruser 102 then reads and displays the network printing start HTML file designated at activation time.

The network printing start HTML file includes a tag for reading a network print start function expander. The network print start function expander is the function expander 103 for the network peruser 102, and has as a function the issuance to the document editor 104 of a request for the generation of data for network printing.

At STEP803, the network printing start function expander employs the application inter-communication function of the OS that is used to control the operation of the client computer 101 to request that the document editor 104 generate network printing data for a document that is being edited.

At STEP804, upon receiving the request, the document editor 104 generates network printing data for a document that is being edited. Included in the printing data, in script form, is editing information, which is history information for editing an image, and the ID of an image that is employed.

At the same time, a preview image, which is a low-resolution image, is generated to display on the network peruser 102 a preview of the image that is to be printed.

At STEP805, the document editor 104 employs the application inter-communication function of the OS running on the client computer 101 to notify the network printing start function expander of the paths of the generated network printing data file and the preview image file.

At STEP806, the network printing start function expander generates an HTML file in order to display a print detail information setup page for displaying the received preview image file and for setting print detail information. The network printing start function expander permits the network peruser 102 to display the HTML file by using the function provided by the network peruser 102.

The HTML file includes a tag for reading a printing order generation function expander. The printing order generation function expander is a function expander 103 that has as an additional function the provision of a user interface for the network peruser 102, so that a user can enter a necessary setup for the printing order and for the generation of the printing order file in which the printing order information is described.

Figures 9, 10:
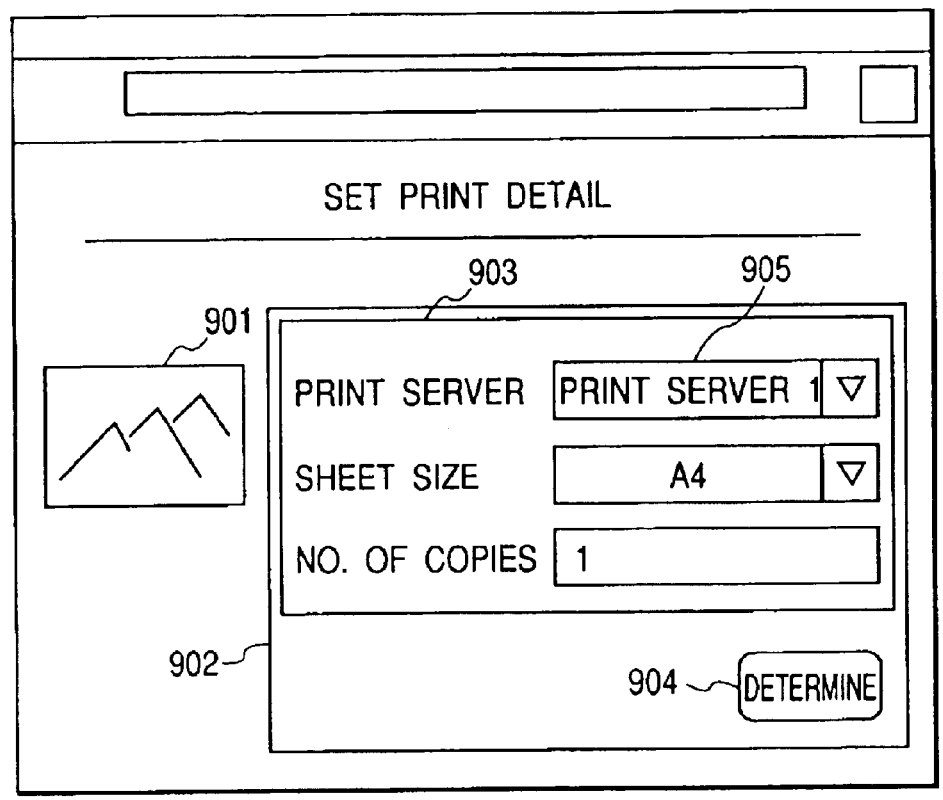
FIG. 9 is a diagram for explaining a print detail information setup page.
FIG. 10 is a diagram showing an example printing order file.

FIG. 9 is a diagram showing a print detail information setup page. A preview image generated by the document editor 104 is displayed by the network peruser 102 in a preview image display area 901 on the left side in FIG. 9. A print detail information display area 902 is displayed to the right of the preview image display area 901 by the printing order generation function expander. Included in the print detail information display area 902 are a print detail information setup area 903, wherein a print server name, a printing sheet size and the number of copies are designated, and a decision button 904, for starting the generation of a printing order. In FIG. 9, a pop-up list 905 is used to select a print server name. The item displayed in the pop-up list 905 block is one of those included in a list of file names of print server information files that are obtained from the print controller 105 and are stored on the HDD 1009. When the print server name in the pop-up list 905 is selected, the printing order generation function expander reads a print server information file (shop information file), which is stored on the HDD 1009 at STEP 505, for a print server corresponding to the print server name, and updates the item in the printing sheet size pop-up list.

The user changes the value shown in the print detail information setup area 903 to obtain a desired print setup.

At STEP807, a check is performed to determine whether the decision button 904 has been depressed. When the user depresses the decision button 904, at STEP808 the printing order generation function expander obtains the values displayed in the print detail setup area 903 and generates the printing order file.

FIG. 10 is a diagram showing an example printing order file. A network printing data file name, the name of a print server to be used, a printing sheet size and the number of copies to be prepared are entered in the printing order file.

While at STEP808 the item entries for "output shop (print server)", "sheet size" and "the number of copies" are determined as is shown in FIG. 9, the information included in the printing order in FIG. 10 can be increased by additionally providing in the print detail information setup screen in FIG.

9 the entries "regular paper, glossy paper" for the selection of an "output form."

At STEP809, the printing order generation expander employs the print server information that is stored on the HDD 1009 at STEP505 in FIG. 5 to calculate a printing fee quotation for the printing order, generates HTML code for a fee display page, and permits the network peruser 102 to display the HTML code by using the function provided by the network peruser 102.

Figure 11:
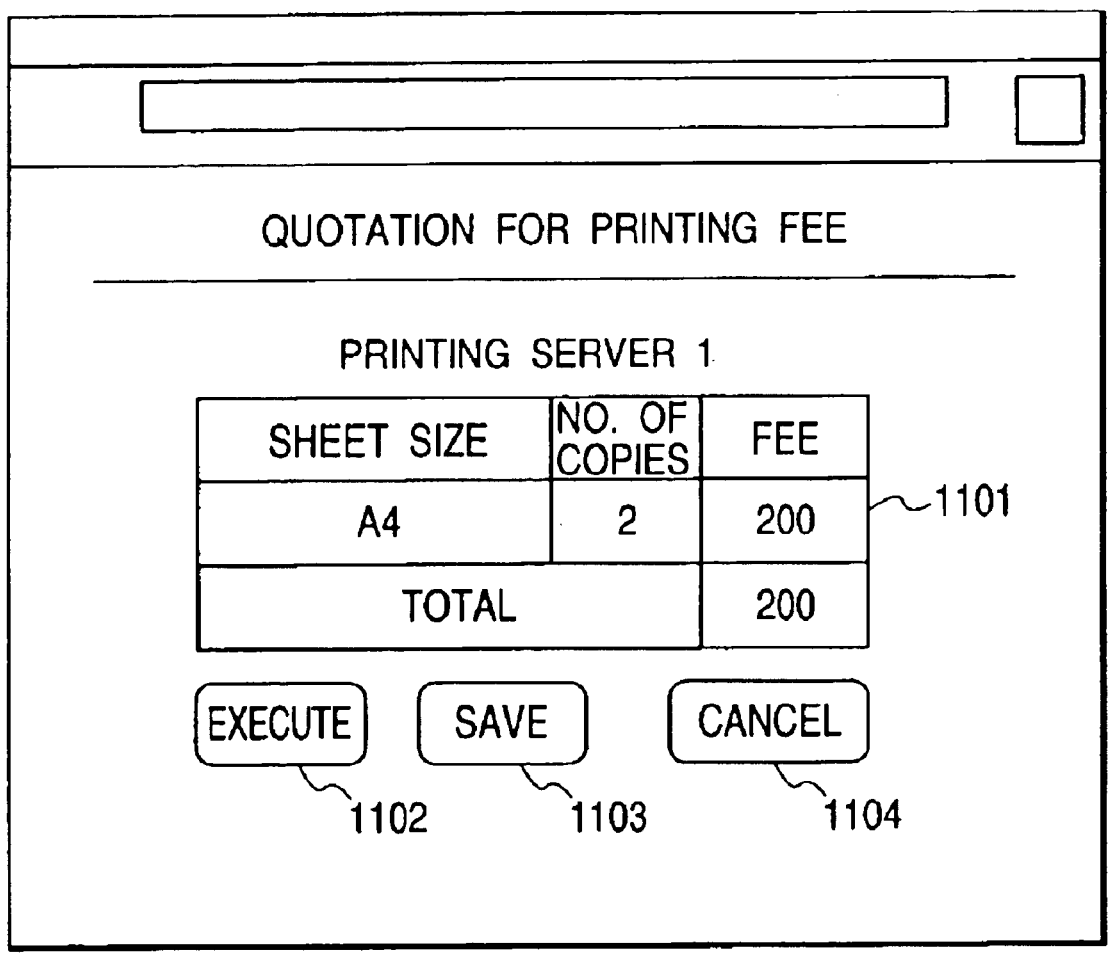
FIG. 11 is a diagram for explaining a printing fee display page.

An example fee display quotation page is shown in FIG. 11. The HTML data for the fee display page includes a tag for reading the printing order request function expander. The printing order request function expander is the function expander 103, for the network peruser 102, that displays an execute button in the fee display page, and that executes a corresponding function in response to the depression of the button.

The fee display page provides the details 1101 of the printing order, which are displayed by the network peruser 102, and an execute button 1102, a save button 1103 and a cancel button 1104, which are displayed by the printing order request function expander.

At STEP810, a check is performed to determine whether the execute button 1102 has been depressed. When the execute button 1102 has not been depressed, program control advances to STEP811. When it is ascertained that the user has depressed the execute button 1102 using the external input device 1008, at STEP812 the printing order request function expander (a plug-in) 103 writes additional fee information in the printing order file, accesses the center server 105 via the browser 102 by a dial-up connection, and sets up the session. Then, to request printing the printing order request function expander 103 transmits a network printing data file and a printing order file to the print controller 105, and executes the printing order request CGI program in the print controller 105. Hereinafter, the printing data file and the printing order file are jointly called the printing order. In addition, the printing order request function expander 103 downloads a print server information file in the print controller 105 that corresponds to a print server information file stored on the HDD 1009 of the client computer 101, and updates the print server information file on the HDD 1009.

When the printing request is executed, the printing fee is calculated again by using the print server information in the print controller 105, and a fee display page, not including the save button 1103 in FIG. 11, is displayed. When the user selects the execute button 1102 using the external input device 1009, the CGI program of the print controller 105 is activated to perform printing, and the processing is thereafter terminated.

In this embodiment, confirmation of the printing fee by the user is required after the printing request has been issued. However, when the update date for the shop information managed by the client 101 is the same as that for the shop information managed by the center server 105, confirmation of the printing fee is not required. As a result, the labor required of a user can be further reduced. For the determination of the update date, the printing order request function expander 103 adds the update data for the shop information to the printing order, and transmits the printing order to the center server 105. Then, the update data in the printing order is compared with the update date for the shop information managed by the center server, and only when these update dates differ, is the HTML file that represents a page for the redisplay of the printing fee displayed by the browser 102.

As another method that can be used to determine the update date, immediately after the session with the center server 105 set up, the printing order request function expander 103 obtains, from the center server 105, only the information for the date for updating the shop information of an output shop, and compares that update date with the update date for the shop information stored on the HDD 1009 of the client computer 101. Only when these update dates differ is a request transmitted to the WWW server 109 in the center server 105 to execute the CGI program for fee calculation.

When the execute button 1102 has not been depressed at STEP810, program control advances to STEP811, whereat a check is performed to determine whether the save button 1103 has been selected. When the save button 1103 has not been selected, program control moves to STEP814.

When it is ascertained that the user has depressed the save button 1103 using the external input device 1108, at STEP813 the printing order request function expander 103 prepares a directory for the printing order at a predetermined location on the HDD 1009, and copies to that location the network printing data file and the printing order file. The processing is thereafter terminated. Upon the depression of the save button 1103, the network printing data file and the printing order file that are copied can collectively be transmitted/printed, as will be described later.

At STEP814, a check is performed to determine whether the cancel button 1104 has been selected. When the cancel button 1104 has not been selected, program control returns to STEP810. If the cancel button 1104 has been selected by the user, at STEP815 the printing order request function expander 103 cancels the network printing file and the printing order file. The processing is thereafter terminated.

Collective Printing of a Printing Order File

When a printing order execution command in the document editor 104 is selected by a user, a printing request is issued using the printing order stored on the HDD 1009 of the client computer 101.

The document editor 104 activates the network peruser 102 by using as an argument the path described in a printing order execution HTML file stored on the HDD 1009, and permits the network peruser 102 to display a printing order execution page.

The printing order execution HTML file includes a tag for reading a printing order execution function expander. The printing order execution function expander is the function expander 103 that provides, for the network peruser 102, a function for displaying on the network peruser 102 buttons for selecting a printing order file and for executing a printing order, and a function for selecting the printing order file or executing the printing order upon the depression of a button.

Figure 12:
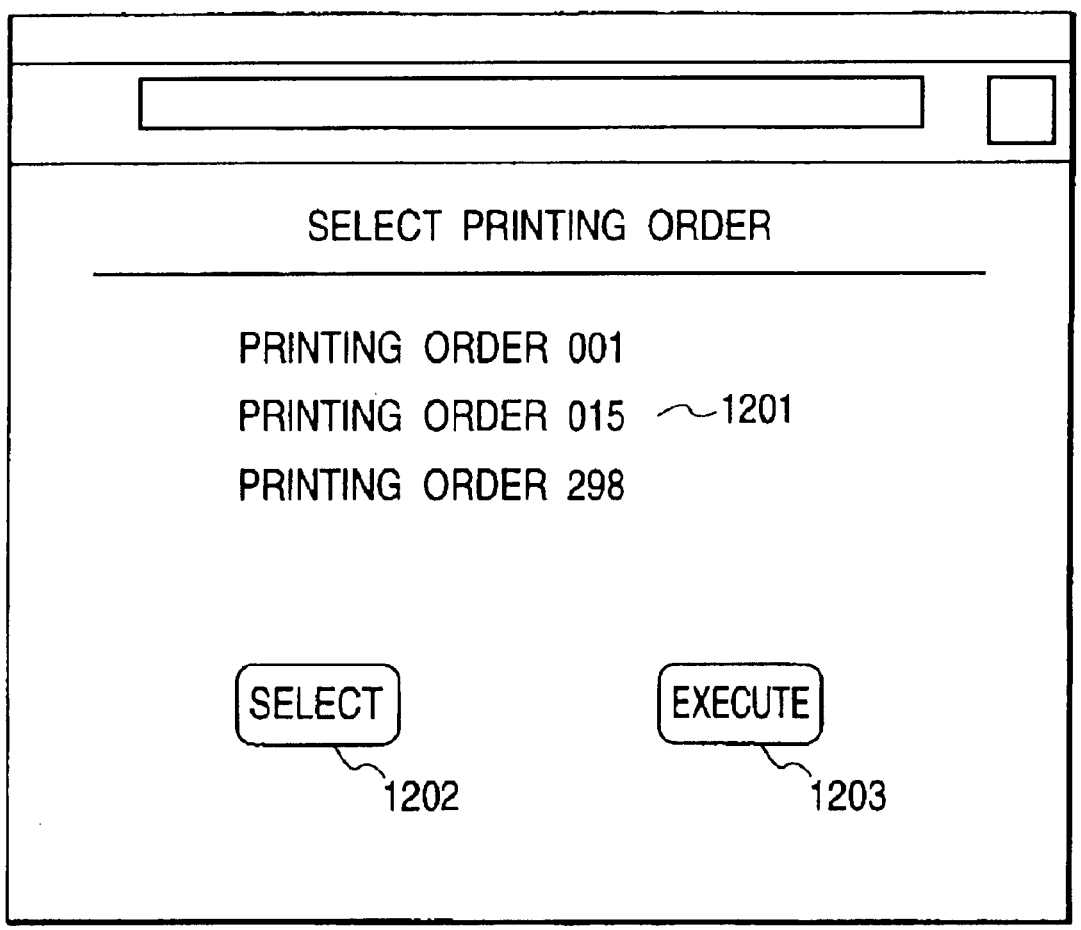
FIG. 12 is a diagram for explaining a printing order selection page.

FIG. 12 is a diagram showing an example printing order execution page. The printing order execution page includes a printing order name list 1201, which is displayed by the network peruser 102, and a printing order selection button 1202 and a printing order execution button 1203, which are displayed by the printing order execution function expander 103.

When a user selects the printing order selection ill button 1202 using the external input device 1008, the standard file selection dialogue box is displayed by the OS running on the client computer 101. When a printing order file stored on the HDD 1009 is designated in a file designation area in the file selection dialogue box, and the selection button in the file selection dialogue box is depressed, an HTML file is generated on the HDD 1009 for the printing order execution page that includes the printing order name list 1201, to which is added the printing order file name selected in the file selection dialogue box. The HTML page is displayed by the network peruser 102.

When a user selects the printing order execution button 1203 using the external input device 1008, for each printing order file displayed in the printing order file name list 1201, a printing order file and a network printing data file described in the printing order file are transmitted by the printing order execution function expander to the print controller 105. Then, the printing order request CGI program in the print controller 104 is executed to carry out the printing request. The name of the print server that executes the printing order is transmitted as an argument for the printing order request CGI program.

Operation of a Print Controller

When a user uses the external input device 1008 to select the execute button 1102 on the fee display page, and the CGI program of the print controller 105 is executed, the print controller 105 transmits the printing order file, the network printing data file described in the printing order file, and a printing image, which is represented by an image ID described in the network printing data file, to the print server corresponding to the print server name that is received from the client computer 101 as the argument for the CGI program. The print controller 105 then requests the print server to perform the printing. When a print request from the client computer 101 includes a plurality of printing orders, the above process is repeated for each printing order file.

Figures 13, 14:
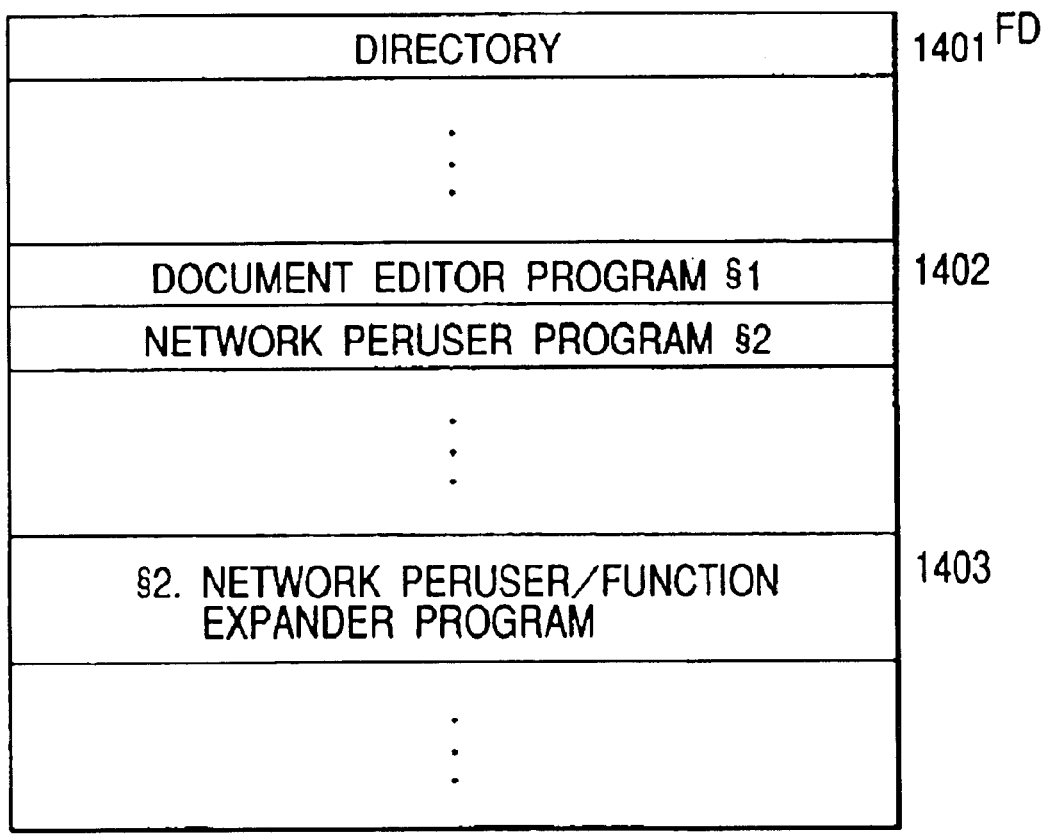
FIG. 13 is a diagram showing an example table for print server names and corresponding network addresses.
FIG. 14 is a diagram showing a memory map for the client computer.

A table in FIG. 13 in which print server names and corresponding network addresses are entered is stored on the HDD 2009 of the print controller 105. The print execution request is issued by obtaining from this table the network address of the print server.

Printing by Print Server

Upon receiving of a print request (a printing order) from the print controller 105, the print servers 104, 105 and 106 employ editing information to edit image data in accordance with the sheet size and the number of copies, which are described in the received printing order file, and the network printing data file and the printing image, which are included in the printing order. The resultant image data are transmitted via the PRTC 3011 to the PRT 3012 for printing.

Loading of a Program from a Storage Medium

FIG. 14 is a diagram showing an example memory map for an external storage medium (a removable disk, such as a floppy disk or a CD-R) for storing the programs for the document editor 104, the network peruser 102 and the function expander 103 for the client computer 101 in this embodiment.

In FIG. 14, directory information included in an area 1401 contains position information for the storage in a storage location 1402 of the program for the document editor 104 and the program for the network peruser 102.

Position information for the storage in a storage location 1403 of a program for the function expander 103 (a plug-in module) used by the network peruser 102 is also included in the directory information in area 1402.

The program for the document editor 104 is installed by following the memory map, and reading the program from area 1402 on the FDD 1010 and loading it into the RAM 1002. Similarly, the program for the network peruser 102 is installed by following the memory map, and reading the program from area 1402 on the FDD 1010 and loading it into the RAM 1002. At this time, the program for the function expander 103 is also read from area 1403 and loaded into the RAM 1002, and is employed while interacting with the network peruser 102.

The programs for controlling the CPU 1001 in the flowcharts in FIGS. 5, 8, 15 and 16 (FIGS. 15 and 16 will be described later) are also stored on a storage medium.

Expansion of a Network Peruser

In this embodiment, the function of the network peruser 102 is expanded by additionally providing the function expander (a plug-in) 103 for the network peruser 102. A unique dedicated application program, for perusing a network, that includes the functions of both units 102 and 103 may be independently prepared to perform these functions.

As is described above, according to the printing control apparatus of the present invention, since the network is accessed only when necessary, communication costs can be reduced for the interactive service performed via the network peruser 102. In addition, in a low communication speed environment, the interactive response is improved by the elimination of unnecessary communication transactions.

[Second Embodiment]

A second embodiment of the present invention will now be described. It should be noted that the system configuration is the same as that for the first embodiment.

Execution of Network Printing

Figure 15:
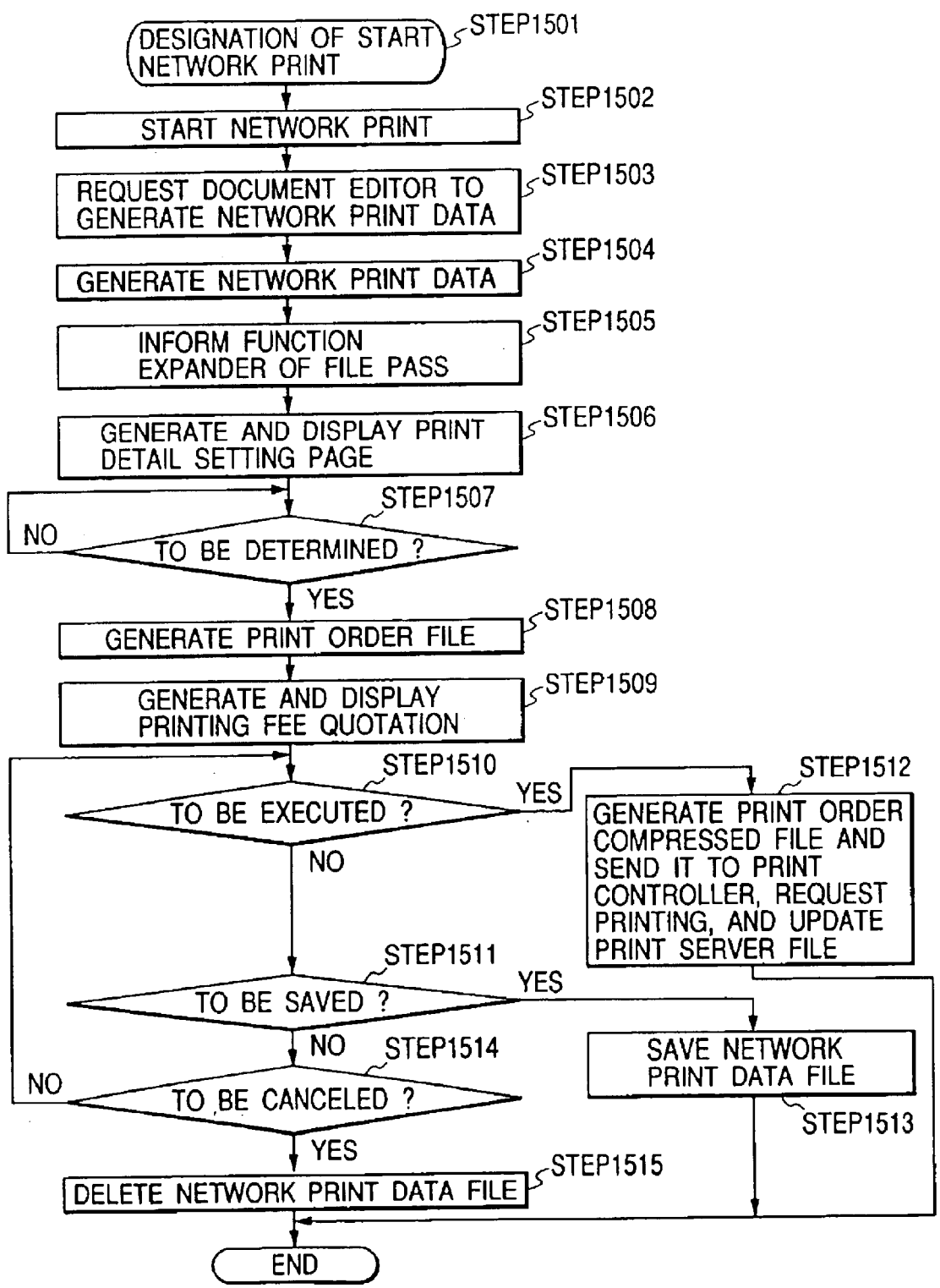
FIG. 15 is a flowchart showing the network printing processing performed by the client computer according to a second embodiment of the present invention.

FIG. 15 is a flowchart showing the network printing processing performed using the network peruser 102 of the client computer 101.

At STEP1501, when a user selects a network print command in the document editor 104, or a print button on the user interface, the document editor 104 issues a request for the printing of a document that is being edited.

At STEP1502, the document editor 104 activates the network peruser 102 by using as an argument the path of a network printing start HTML file stored on the HDD 1009. The network printing start HTML file is stored on the HDD 1009 by a derivation program when the document editor 104 is operated by the client computer 101, and its path is recorded in a setup file that is used to store various setups for the document editor 104.

The network peruser 102 then reads and displays the network printing start HTML file designated at activation time.

The network printing start HTML file includes a tag for reading a network print start function expander. The network print start function expander is the function expander 103 for the network peruser 102, and has as a function the issuance to the document editor 104 of a request for the generation of data for network printing.

At STEP1503, the network printing start function expander employs the application inter-communication function of the OS that is used to control the operation of the client computer 101 to request that the document editor 104 generate network printing data for a document that is being edited.

At STEP1504, upon receiving the request, the document editor 104 generates network printing data for a document that is being edited.

At the same time, a preview image, which is a low-resolution image, is generated to display on the network peruser 102 a preview of the image that is to be printed.

At STEP1505, the document editor 104 employs the application inter-communication function of the OS running on the client computer 101 to notify the network printing start function expander of the paths of the generated network printing data file and the preview image file.

At STEP1506, the network printing start function expander generates an HTML file in order to display a print detail information setup page for displaying the received preview image file and for setting print detail information. The network printing start function expander permits the network peruser 102 to display the HTML file by using the function provided by the network peruser 102.

The HTML file includes a tag for reading a printing order generation function expander. The printing order generation function expander is a function expander 103 that has as an additional function the provision of a user interface for the network peruser 102, so that a user can enter a necessary setup for the printing order and for the generation of the printing order file in which the printing order information is described.

At STEP1507, a check is performed to determine whether the decision button 904 has been depressed. When the user depresses the decision button 904, at STEP1508 the printing order generation function expander obtains the values displayed in the print detail setup area 903 and generates the printing order file described above in FIG. 10.

At STEP1509, the printing order generation expander employs the print server information that is stored on the HDD 1009 to calculate a printing fee quotation for the printing order, generates HTML code for the fee display page described above in FIG. 11, and permits the network peruser 102 to display the HTML code by using the function provided by the network peruser 102.

At STEP1510, the printing order request function expander determines whether or not the execute button 1102 has been depressed. When the execute button 1102 has not been depressed, program control advances to STEP1511. When it is ascertained that the user has depressed the execute button 1102 using the external input device 1008, program control moves to STEP1512.

At STEP1512, the printing order request function expander combines the network printing data file and the printing order file into one archive file, and compresses this file to form a printing order compressed file. The printing order request function expander transmits the printing order compressed file to the print controller 105, and executes the printing order request CGI program, in the print controller 105, to request printing. In addition, the printing order request function expander 103 downloads a print server information file in the print controller 105 that corresponds to a print server information file stored in the client computer 101, and updates the print server information file on the HDD 1009.

When the printing request is executed, the printing fee is calculated again by using the print server information in the print controller 105, and a fee display page, not including the save button 1103 in FIG. 11, is displayed. When the user selects the execute button 1102 using the external input device 1009, the CGI program of the print controller 105 is activated to perform printing, and the processing is thereafter terminated.

At STEP1511, a check is performed to determine whether the save button 1103 has been selected. When the save button 1103 has not been selected, program control moves to STEP1514.

When it is ascertained that the user has depressed the save button 1103 using the external input device 1108, at STEP1513 the printing order request function expander 103 prepares a directory for the printing order at a predetermined location on the HDD 1009, and copies to that location the network printing data file and the printing order file. The processing is thereafter terminated. Upon the depression of the save button 1103, the network printing data file and the printing order file that are copied can collectively be transmitted/printed, as will be described later.

At STEP1514, a check is performed to determine whether the cancel button 1104 has been selected. When the cancel button 1104 has not been selected, program control returns to STEP1510.

If the cancel button 1104 has been selected by the user, at STEP1515 the printing order request function expander 103 cancels the network printing file and the printing order file. The processing is thereafter terminated.

Collective Printing of a Printing Order File

When a user selects the printing order execute button 1203 on the printing order selection page by using the external input device 1008, the printing order execution function expander performs the following processing for each printing order file in the printing order file list.

1) The printing order execution function expander combines a printing order file and a network printing data file described in that printing order file to form an archive file, and compresses the archive file to obtain a printing order compressed file.

2) The printing order execution function expander transmits the printing order compressed file to the print controller 105, and executes the printing order request CGI program, in the print controller 105, to request printing. The name of the print server that executes the printing order is transmitted as an argument to the printing order request CGI program.

Operation of a Print Controller

When a user uses the external input device 1008 to select the execute button 1102 on the fee display page, and the CGI program of the print controller 105 is executed, the print controller 105 transmits the printing order compressed file, the network printing data file described in the printing order file, and a printing image, which is represented by an image ID described in the network printing data file, to the print server corresponding to the print server name that is received from the client computer 101 as the argument for the CGI program. The print controller 105 then requests the print server to perform the printing. When a print request from the client computer 101 includes a plurality of printing orders, the above process is repeated for each printing order file.

A table in FIG. 13 in which print server names and corresponding network addresses are entered is stored on the HDD 2009 of the print controller 105. The print execution request is issued by obtaining from this table the network address of the print server.

Printing by Print Server

Upon receiving of a print request (a printing order) from the print controller 105, the print servers 104, 105 and 106 decompress the received printing order compressed file and separate the resultant file into a printing order file and a network printing data file. Then, the print servers 104, 105 and 106 employ editing information to edit image data in accordance with the sheet size and the number of copies that are described in the received printing order file. The resultant image data are transmitted via the PRTC 3011 to the PRT 3012 for printing.

Expansion of a Network Peruser

In this embodiment, the function of the network peruser 102 is expanded by additionally providing the function expander (a plug-in) 103 for the network peruser 102. A unique dedicated application program, for perusing a network, that includes the functions of both units 102 and 103 may be independently prepared to perform these functions.

As is described above, according to the printing control apparatus of the present invention, since the network is accessed only when necessary, communication costs can be reduced for the interactive service performed via the network peruser 102. In addition, in a low communication speed environment, the interactive response is improved by the elimination of unnecessary communication transactions.

Furthermore, since the printing order file and the network printing data file are combined, and the resultant file is compressed and transmitted, the transmission times and the volume of the files transmitted, and the communication costs can be reduced.

[Third Embodiment]

A third embodiment of the present invention will now be descried. It should be noted that the system configuration is the same as that for the first embodiment.

HTML Template

In this embodiment, when the function expander 103 for the network peruser 102 in the client computer 101 generates an HTML file, the function expander 103 refers to and employs as an HTML template file an HTML file generation source stored on the HDD 1009 of the client computer 101. At the time the user interface that is provided by the HTML file generated by the CGI program of the print controller 105 is updated, the HTML template file is also updated by the manager of the print controller 105, so that the updating of the user interface at the print controller 105 will be reflected in the user interface the HTML file generated by the function expander 103 provides for the network peruser 102 in the client computer 101.

An example HTML template file for the print detail information setup page in FIG. 9 is shown in FIG. 17A. The portion sandwiched by at (@) marks in FIG. 17A indicates a portion that is replaced by the function expander 103.

FIG. 17B is a diagram showing an example HTML template file that is generated by the function expander 103 while referring to FIG. 17A.

The portion @PREVIEW@ is replaced with the file page for a preview image that is generated by the document editor 104 and is transmitted to the function expander 103.

The portion sandwiched by at marks in the HTML template file differs depending on the HTML template file. The contents to be replaced are provided as parameters for the function expander 103, or as environment information that is stored in advance by the environment information saving function (e.g., an environment variable, a registry of Windows (a trademark of Microsoft Corp.), or a setup file for a WWW server) of the OS running on the client computer 101.

The latest HTML template file is downloaded during the registration process for the print server and the processing for the transmission of print data to the print controller 105, which will be described later. Thus, a corresponding HTML template file stored on the HDD 1009 of the client computer 101 can be updated.

Registration of Print Server

Before employing the system of the present invention, a user first accesses the WWW server 109 in the print controller 105 by using the network peruser 102 of the client computer 101, and registers a print server to be employed.

The registration process is performed in accordance with the flowchart in FIG. 5, as explained in the first embodiment. In the third embodiment, at the same time as the registration process is performed, the print server information download function expander downloads, to the client computer 101, an HTML template file stored on the HDD 2009 of the print controller 105, and stores the HTML template file on the HDD 1009.

Execution of Network Printing

Figure 16:
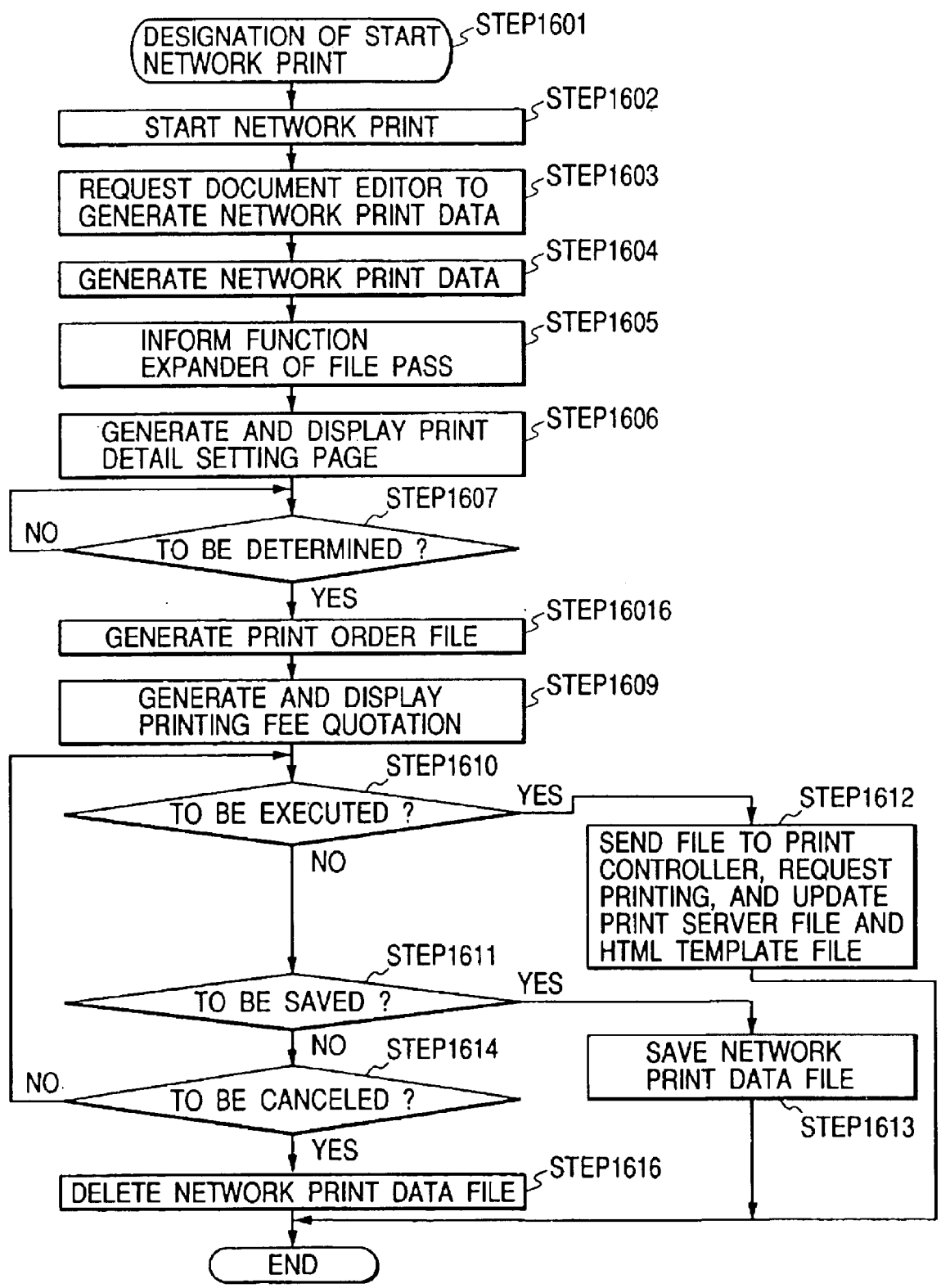
FIG. 16 is a flowchart showing the network printing processing performed by the client computer according to a third embodiment of the present invention.

FIG. 16 is a flowchart showing the network printing processing performed using the network peruser 102 of the client computer 101.

At STEP1601, when a user selects a network print command in the document editor 104, the document editor 104 issues a request for the printing of a document that is being edited.

At STEP1602, the document editor 104 activates the network peruser 102 by using as an argument the path of a network printing start HTML file stored on the HDD 1009. The network printing start HTML file is stored on the HDD 1009 by a derivation program when the document editor 104 is operated by the client computer 101, and its path is recorded in a setup file that is used to store various setups for the document editor 104. The document editor 104 obtains the path of the network printing start HTML file from the setup file.

The network peruser 102 then reads and displays the network printing start HTML file designated at activation time.

The network printing start HTML file includes a tag for reading a network print start function expander. The network print start function expander is the function expander 103 for the network peruser 102, and has as a function the issuance to the document editor 104 of a request for the generation of data for network printing.

At STEP1603, the network printing start function expander employs the application inter-communication function of the OS that is used to control the operation of the client computer 101 to request that the document editor 104 generate network printing data for a document that is being edited.

At STEP1604, upon receiving the request, the document editor 104 generates network printing data for a document that is being edited.

At the same time, a preview image, which is a low-resolution image, is generated to display on the network peruser 102 a preview of the image that is to be printed.

At STEP1605, the document editor 104 employs the application inter-communication function of the OS running on the client computer 101 to notify the network printing start function expander of the paths of the generated network printing data file and the preview image file.

At STEP1606, the network printing start function expander generates an HTML file in order to display a print detail information setup page for displaying the received preview image file and for setting print detail information. The network printing start function expander permits the network peruser 102 to display the HTML file by using the function provided by the network peruser 102.

The HTML file includes a tag for reading a printing order generation function expander. The printing order generation function expander is a function expander 103 that has as an additional function the provision of a user interface for the network peruser 102, so that a user can enter a necessary setup for the printing order and for the generation of the printing order file in which the printing order information is described.

FIG. 9 is a diagram showing a print detail information setup page. A preview image generated by the document editor 104 is displayed by the network peruser 102 in a preview image display area 901 on the left side in FIG. 9. A print detail information display area 902 is displayed to the right of the preview image display area 901 by the printing order generation function expander. Included in the print detail information display area 902 are a print detail information setup area 903, wherein a print server name, a printing sheet size and the number of copies are designated, and a decision button 904, for starting the generation of a printing order. In FIG. 9, a pop-up list 905 is used to select a print server name. The item displayed in the pop-up list 905 block is one of those included in a list of file names of print server information files that are obtained from the print controller 105 and are stored on the HDD 1009. When the print server name in the pop-up list 905 is selected, the printing order generation function expander reads a print server information file, which is stored on the HDD 1009 at STEP 505, for a print server corresponding to the print server name, and updates the item in the printing sheet size pop-up list.

The user changes the value shown in the print detail information setup area 903 to obtain a desired print setup.

At STEP1607, a check is performed to determine whether the decision button 904 has been depressed. When the user depresses the decision button 904, at STEP1608 the printing order generation function expander obtains the values displayed in the print detail setup area 903 and generates the printing order file described above in FIG. 10.

At STEP1609, the printing order generation expander employs the print server information that is stored on the HDD 1009 to calculate a printing fee quotation for the printing order, generates HTML code for the fee display page described above in FIG. 11, and permits the network peruser 102 to display the HTML code by using the function provided by the network peruser 102.

At STEP1610, a check is performed to determine whether the execute button 1102 has been depressed. When the execute button 1102 has not been depressed, program control advances to STEP1611. When it is ascertained that the user has depressed the execute button 1102 using the external input device 1008, at STEP1612 the printing order request function expander 103 transmits a network printing data file and a printing order file to the print controller 105, and executes the printing order request CGI program in the print controller 105. In addition, the printing order request function expander 103 downloads an HTML template file and a print server information file in the print controller 105 that corresponds to a print server information file stored on the HDD 1009 of the client computer 101, and updates the HTML template file and the print server information file on the HDD 1009.

When the printing request is executed, the printing fee is calculated again by using the print server information in the print controller 105, and a fee display page, not including the save button 1103 in FIG. 11, is displayed. When the user selects the execute button 1102 using the external input device 1009, the CGI program of the print controller 105 is activated to perform printing, and the processing is thereafter terminated.

At STEP1611, a check is performed to determine whether the save button 1103 has been selected. When the save button 1103 has not been selected, program control moves to STEP1614.

When it is ascertained that the user has depressed the save button 1103 using the external input device 1108, at STEP1613 the printing order request function expander 103 prepares a directory for the printing order at a predetermined location on the HDD 1009, and copies to that location the network printing data file and the printing order file. The processing is thereafter terminated. Upon the depression of the save button 1103, the network printing data file and the printing order file that are copied can collectively be transmitted/printed, as will be described later.

At STEP1614, a check is performed to determine whether the cancel button 1104 has been selected. When the cancel button 1104 has not been selected, program control returns to STEP1610. If the cancel button 1104 has been selected by the user, at STEP1615 the printing order request function expander 103 cancels the network printing file and the printing order file. The processing is thereafter terminated.

Printing by Print Server

Upon receiving of a print request (a printing order) from the print controller 105, the print servers 104, 105 and 106 transmit a network printing data file via the PRTC 3011 to the PRT 3012 and print the file in accordance with the sheet size and the number of copies that are described in the received printing order file.

Expansion of a Network Peruser

In this embodiment, the function of the network peruser 102 is expanded by additionally providing the function expander (a plug-in) 103 for the network peruser 102. A unique dedicated application program, for perusing a network, that includes the functions of both units 102 and 103 may be independently prepared to perform these functions.

As is described above, according to the printing control apparatus of the present invention, since the network is accessed only when necessary, communication costs can be reduced for the interactive service performed via the network peruser 102. In addition, in a low communication speed environment, the interactive response is improved by the elimination of unnecessary communication transactions.

Since, to generate an HTML file, the function expander for the network peruser employs the HTML template file that is to be downloaded when the connection with the print controller is established, the user interface for the client computer can be automatically updated when the user interface for the print controller is updated.

Furthermore, since the printing order file and the network printing data file are combined and the resultant file is compressed and transmitted, the transmission times and the volume of the files transmitted, and the communication costs can be reduced.

What is claimed is:

1. An information processing apparatus, for communicating via the Internet with an external apparatus, comprising:

acquisition means for establishing a first communication with the external apparatus, acquiring print setting information from the external apparatus, and storing the print setting information in a memory;

page generation means for generating a print request page based on the print setting information, after suspending the first communication and before establishing a second communication with the external apparatus;

file generation means for generating a print request file according to values input on the print request page;

calculating means for calculating a printing fee quotation for the generated print request file; and print request means for establishing the second communication with the external apparatus and sending the generated print request file, after executing a process for displaying the calculated printing fee quotation, wherein the print request page is generated before the communication with the external apparatus is established by said print request means.

2. An apparatus according to claim 1, wherein the print setting information indicates an output style in which output is available at a printer that executes printing based on the print request information.

3. An apparatus according to claim 1, further comprising check means for checking whether the printing setting information which is available at the external apparatus is newer than the printing setting information stored in the memory, wherein said acquisition means executes the acquisition in accordance with the result of the check.

4. An apparatus according to claim 1,
wherein the print setting information is HTML data generated for the external apparatus, and
wherein the external apparatus manages the print setting information for each of at least one output shop.

5. An apparatus according to claim 1, wherein said page generation means performs a peruser plug-in function and uses an application communication function of an OS to generate the print request page of a document that is currently being edited by a document editor.

6. An apparatus according to claim 1, wherein, for communication purposes, a dial-up connection is used to connect the external apparatus to the Internet.

7. An apparatus according to claim 1, further comprising:
second acquisition means for acquiring a template file separately from the print setting information,
wherein the print setting file is generated with reference to the template file.

8. An apparatus according to claim 1, further comprising:
means for detecting an update time of the print setting information stored in the memory;
means for detecting an update time of the print setting information managed by the external apparatus;
means for comparing the detected update times; and
means for regenerating the print setting page in accordance with a comparison result.

9. An apparatus according to claim 1, wherein said page generation means further generates a print request page based on a preview image of print data that is currently begin edited.

10. A method, for controlling an information processing apparatus, for communicating via the Internet with an external apparatus, said method comprising:
an acquisition step, of establishing a first communication with the external apparatus, acquiring print setting information from the external apparatus, and storing the print setting information in a memory;
a page generation step, of generating a print request page based on the print setting information, after suspending the first communication and before establishing a second communication with the external apparatus;
a file generation step, of generating a print request file according to values input on the print request page;
a calculating step, of calculating a printing fee quotation for the generated print request file; and
a print request step, of establishing the second communication with the external apparatus and sending the generated print request file, after executing a process for displaying the calculated printing fee quotation,
wherein the print request page is generated before the communication with the external apparatus is established in said print request step.

11. A method according to claim 10, wherein the print setting information indicates an output style in which output is available at a printer that executes printing based on the print request information.

12. A method according to claim 10, further comprising a check step, of checking whether the printing setting information which is available at the external apparatus is newer than the printing setting information stored in the memory, wherein said acquisition step includes executing the acquisition in accordance with the result of the check.

13. A method according to claim 10,
wherein the print setting information is HTML data generated for the external apparatus, and
wherein the external apparatus manages the print setting information for each of at least one output shop.

14. A method according to claim 10,
wherein said page generation step includes performing a peruser plug-in function and uses an application communication function of an OS to generate the print request page of a document that is currently being edited by a document editor.

15. A method according to claim 10, wherein, for communication purposes, the external apparatus and the information processing apparatus are linked together via the Internet by a dial-up connection.

16. A method according to claim 10, further comprising:
a second acquisition step, of acquiring a template file separately from the print setting information,
wherein the print setting file is generated with reference to the template file.

17. A method according to claim 10, wherein the print setting page includes information indicating a paper size supported at a print shop.

18. A method according to claim 10, wherein said acquisition step includes acquiring a plurality of kinds of print server information and the print setting page includes a list for selection of the print server.

19. A method according to claim 10, further comprising:
a second acquisition step, of acquiring a template file separately from the print setting information; and
a preview generating step, of generating a print preview image,
wherein the page generation step includes updating the template file such that the generated print preview image is displayed within the template.

20. A computer-readable memory medium storing a program for controlling an information processing apparatus, for communicating via the Internet with an external apparatus, said program comprising:
an acquisition step, of establishing a first communication with the external apparatus, acquiring print setting information from the external apparatus, and storing the print setting information in a memory;
a page generation step, of generating a print request page based on the print setting information, after suspending the first communication and before establishing a second communication with the external apparatus;
a file generation step, of generating a print request file according to values input on the print request page;
a calculating step, of calculating a printing fee quotation for the generated print request file; and
a print request step, of establishing the second communication with the external apparatus and sending the generated print request file, after executing a process for displaying the calculated printing fee quotation,
wherein the print request page is generated before the communication with the external apparatus is established in said print request step.

21. A computer-readable memory medium according to claim 20, wherein the print setting information indicates an output style in which output is available at a printer that executes printing based on the print request information.

22. A computer-readable memory medium according to claim 20, further comprising a check step, of checking whether the printing setting information which is available at the external apparatus is newer than the printing setting information is stored in the memory wherein said acquisition step includes executing the acquisition in accordance with the result of the check.

23. A computer-readable memory medium according to claim 20,
wherein the print setting information is HTML data generated for the external apparatus, and
wherein the external apparatus manages the print setting information for each of at least one output shop.

24. A computer-readable memory medium according to claim 20,
wherein said page generation step includes performing a browser plug-in function and employs an application communication function of an OS to generate the print request page of a document that is currently being edited by a document editor.

25. A computer-readable memory medium according to claim 20, wherein, for communication purposes, the external apparatus and the information processing apparatus are linked together via the Internet by a dial-up connection.

26. A computer-readable memory medium according to claim 20, further comprising:
a second acquisition step, of acquiring a template file separately from the print setting information,
wherein the print setting file is generated with reference to the template file.

27. A computer-readable memory medium according to claim 20, wherein the print setting page includes information indicating a paper size supported at a print shop.

28. A computer-readable memory medium according to claim 20, wherein said acquisition step includes acquiring a plurality of kinds of print server information and the print setting page includes a list for selection of the print server.

29. A computer-readable memory medium according to claim 20, further comprising:
a second acquisition step, of acquiring a template file separately from the print setting information; and
a preview generation step, of generating a print preview image,
wherein said page generation step includes updating the template file such that the generated print preview image is displayed within the template.

30. A computer program product embodying a computer program for controlling an information processing apparatus, for communicating via the Internet with an external apparatus, said program comprising:
an acquisition step, of establishing a first communication with the external apparatus acquiring print setting information from the external apparatus, and storing the print setting information in a memory;
a page generation step, of generating a print request page based on the print setting information, after suspending the first communication and before establishing a second communication with the external apparatus;
a file generation step, of generating a print request file according to values input on the print request page;
a calculating step, of calculating a printing fee quotation for the generated print request file; and
a print request step, of establishing the second communication with the external apparatus and sending the generated print request file, after executing a process for displaying the calculated printing fee quotation,
wherein the print request page is generated before the communication with the external apparatus is established in said print request step.

31. An apparatus according to claim 1, wherein the print setting page includes information indicating a paper size supported at a print shop.

32. An apparatus according to claim 1, wherein said acquisition means acquires plurality kinds of print server information and the print setting page includes a list for selection of the print server.

33. An apparatus according to claim 1, further comprising:
second acquisition means for acquiring a template file separately from the print setting information; and
preview generation means for generating a print preview image,
wherein the page generation means updates the template file such that the generated print preview image is displayed within the template.

* * * * *

UNITED STATES PATENT AND TRADEMARK OFFICE
CERTIFICATE OF CORRECTION

PATENT NO. : 6,886,028 B1  
APPLICATION NO. : 09/362052  
DATED : April 26, 2005  
INVENTOR(S) : Matsuyama et al.

Page 1 of 1

It is certified that error appears in the above-identified patent and that said Letters Patent is hereby corrected as shown below:

COLUMN 8  
Line 27, "sever" should read --server--.

COLUMN 9  
Line 11, "to that is" should read --that is to--.

COLUMN 12  
Line 58, "ill" should be deleted.

COLUMN 17  
Line 7, "descried." should read --described.--.

COLUMN 21  
Line 30, "begin" should read --being--.

COLUMN 22  
Line 65, "information" should read --information that--.

Signed and Sealed this

Fifth Day of December, 2006

JON W. DUDAS  
*Director of the United States Patent and Trademark Office*